United States Patent Office 3,520,820
Patented July 21, 1970

3,520,820
COLD WATER DISPERSIBLE EMULSIONS OF FILMING AMINES
Chih Ming Hwa, Arlington Heights, Ill., assignor to W. R. Grace & Co., New York, N.Y., a corporation of Connecticut
No Drawing. Continuation-in-part of application Ser. No. 407,849, Oct. 30, 1964. This application Jan. 29, 1968, Ser. No. 701,135
Int. Cl. B01j 13/00
U.S. Cl. 252—311
10 Claims

ABSTRACT OF THE DISCLOSURE

Filming amine corrosion inhibitors containing aliphatic fatty amines and acetic acid are mixed with non-ionic emulsifiers to form liquid, cold water dispersible emulsions.

---

This application is a continuation-in-part of copending prior application Ser. No. 407,849, filed Oct. 30, 1964 and now abandoned.

The present invention relates to improvements in forming cold water dispersions of aliphatic fatty amines.

Fatty amines (those containing from 8 to 22 carbon atoms per molecule, and consisting primarily of primary saturated mono-amines) are essentially insoluble in water. For various applications, such as for use as corrosion inhibitors for steam condensate return lines, ore flotation, fabric softening, soil stabilization, and other industrial processes, it would be highly desirable to use a composition of the fatty amine which is cold water dispersible.

There are currently two water dispersible forms of octadecylamine available commercially. The first consists of either octadecylamine acetate or mixtures of octadecylamine acetate and octadecylamine. The second consists of a combination of octadecylamine with non-ionic emulsifiers. Octadecylamine acetate disperses readily in hot water, at temperatures at 185° F. or above, but only slowly in cold water. One percent dispersions of octadecylamine acetate and a blend of 60% octadecylamine and 40% octadecylamine acetate have pH values of 5.3 and 6.2, respectively. They also have very limited tolerance against polyvalent anions such as those present in hard water, for example, sulfate and phosphate ions.

In order to eliminate the effects of acidic dispersions of the amine, it has been suggested that the octadecyl amine be introduced as an alkaline emulsion. However, these materials are in the form of pastes and are not cold water dispersible, and when highly diluted require frequent agitation.

One of the objects of the invention is to provide an improved cold water dispersible fatty amine emulsion which is usable wherever it is required to maintain a predetermined concentration of the amine in an aqueous system.

Another object of the invention is to provide a non-acidic fatty amine emulsion which nevertheless has a workable liquid consistency.

Still another object of the invention is to provide an emulsion of octadecylamine or other fatty amines which is compatible with electrolytes which may be present in make-up water used for preparing a feed solution.

A further object of the invention is to provide a stable fatty amine emulsion which can be diluted to provide feed solutions which do not require frequent agitation to maintain the dispersion.

Another object of the invention is to provide a fatty amine emulsion which is resistant to breakdown after continued cycles of freezing and thawing.

Another object of the invention is to provide an improved method for feeding fatty amines into aqueous systems in which they are normally insoluble.

I have found that when the fatty amine is combined with acetic acid in certain molar proportions a composition with minimal viscosity is obtained. The viscosity of this composition can be lowered substantially by adding a small amount of certain non-anionic (either non-ionic or cationic) emulsifying agents. The emulsifying agent employed is one containing chains of oxyethylene groups in its molecule, and preferably contains at least two chains of oxyethylene groups on at least one nitrogen atom in the molecule. The latter may typically be polyoxyethylated fatty amines or diamines or quaternary salts thereof. More specifically, I have found that when the molar ratio of acetic acid to amine is in the range from about 0.1 to about 0.6 to 1, the cold water dispersibility of the amine is substantially improved, and this improvement can be even further improved upon by the addition of the non-anionic emulsifying agent in amounts ranging from about 0.01 to about 1 times the amount of amine present by weight.

In the most especially preferred embodiment the present invention comprises low viscosity (liquid at normal room temperature), cold water dispersible, fatty amine emulsions consisting essentially of at least about five percent (5%) by weight, based on total weight, of a water insoluble aliphatic fatty amine; from about 0.1 to about 0.6 mole of acetic acid per mole of said fatty amine; from about 0.01 to about 1 part, by weight per part by weight of said amine of a non-anionic emulsifying agent; and water. The invention also comprises methods of feeding water insoluble amines into aqueous systems by feeding the same to said systems in the form of an emulsion as described above.

As previously noted the fatty amines which can be used in the practice of the present invention contain from 8 to 22 carbon atoms. Representative examples of such amines are decyl, lauryl (dodecyl), myristyl (tetradecyl), cetyl (hexadecyl), stearyl (octadecyl), oleyl (octadecenyl) and like amines. The preferred amine is octadecyl amine.

The following emulsifying agents have been found to be effective for the purposes of the present invention:

(1) Block polymers of ethylene oxide and propylene oxide on a backbone of propylene glycol ("Pluronics"):

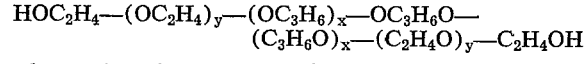

where $x$ is at least 10 and $y$ is at least 1, the molecular weight ranging from about 1000 to 17,000.

(2) Polyoxyethylene fatty amines ("Ethomeens"):

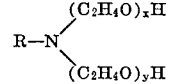

where $R=C_{12}$ to $C_{22}$ and $x+y$ is at least 2, but no more than 100.

(3) Polyoxyethylene N-fatty trimethylene diamines ("Ethoduomeens"):

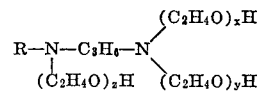

where $R=C_{12}$ to $C_{22}$ and $x+y+z$ is at least 3, but no more than 150.

(4) Alkyl chloride quaternary salts of polyoxyethylene fatty amines ("Ethoquads"):

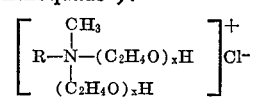

where $R=C_{12}$ to $C_{22}$ and $x+y$ is at least 2, but no more than 100.

(5) Alkyl chloride quaternary salt of polyoxyethylene N-fatty trimethylene diamines ("Ethoduoquads"):

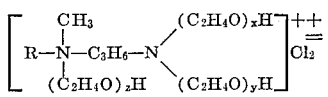

where $R = C_{12}$ to $C_{22}$ and $x+y+z$ is at least 3, but no more than 150.

The amine emulsions of this invention are stable in the presence of such electrolytes as sulfates and phosphates. This is not true for amine-amine acetate emulsions of the type such as those described in U.S. Pat. 3,034,985.

The improvements of the present invention are illustrated in the following specific examples which are intended to illustrate and not limit the scope of the invention.

The following is a brief description of the nomenclature used by the suppliers of the emulsifiers used in the present invention and will serve to more fully identify the specific emulsifier in each of the specific examples:

"Pluronic": The "Pluronic" emulsifiers are identified by a letter and a number. The letter describes the physical form, L being used for a liquid, P for a paste and F for a solid hard enough to be flaked. The first digit or digits multiplied by a factor of 300 gives the approximate molecular weight of the polyoxypropylene block portion of the block polymers. The last digit when multiplied by a factor of 10, gives the percent of ethylene oxide in the total molecule. Thus, Pluronic P94 is a paste with an approximate polyoxypropylene molecular weight of 2700 and in which 40% of the molecule, by weight, consists of polyoxyethylene groups, and the remaining 60% is the polyoxypropylene group.

"Ethomeen," "Ethoduomeen," "Ethoquad," and "Ethoduoquad": These emulsifiers are designated by an initial letter or number, a slant line and a final number such as Ethomeen 18/60. The initial letter or number designates the aliphatic group or groups which compose R as follows:

18 = octadecyl residue
O = oleyl residue
C = coconut acids residue, consisting of $C_{10}$, $C_{12}$ and $C_{14}$ mixed.
T = tallow acids residue, consisting of $C_{16}$ and $C_{18}$ mixed.

The number to the right of the slant line is the number of oxyethylene units plus 10 so that Ethomeen 18/60 is a polyoxyethylene octadecylamine containing a total of 50 oxyethylene units. Ethoduomeen T/40 is a polyoxyethylene N-tallow trimethylene diamine having a total of 30 oxyethylene units.

EXAMPLE I

A mixture of 82.6 parts distilled water, 0.9 parts glacial acetic acid and 15 parts octadecylamine was heated together to 190° F. The addition of octadecylamine resulted in the formation of a paste at this point. After mixing for 5 minutes, 1.5 parts of "Ethoduoquad T/20" (75% active) was added. This mixture was cooled with agitation to a temperature of 117° F. Continued agitation resulted in the production of a uniform, liquid emulsion. This required about 3 hours. A total of about 3% excess water was added to compensate for evaporation losses. The cold water dispersible composition so prepared exhibited good storage stability at at 105° F., 77° F., and 0° F. and produced stable dilute dispersions in water.

A 5% feed solution was prepared by stirring the emulsion in cold distilled water for 5 minutes and the feed solution was then pumped into a flowing steam condensate system containing 1.5 p.p.m. dissolved oxygen and 45 p.p.m. free carbon dioxide. Complete inhibition of corrosion of mild steel was accomplished after feeding this solution at a dosage of 10 p.p.m. of the amine for 14 days. The low viscosity of this material permits direct feeding of the treatment, if desired, without the need of preparing a feed solution. The emulsion had a white color, and was a viscous free-flowing liquid. It had a pH of 7.9, and a viscosity at 77° F. of 5840 centipoises (Brookfield Viscometer, 10 r.p.m.).

EXAMPLE II

A composition was made up by heating octadecylamine (15%), acetic acid (0.7%), and tap water (82.8%) at 190° F., and mixing for 5 minutes. The emulsifier consisted of "Ethomeen 18/60" in an amount of 1.5%. The emulsifier was added and the resulting emulsion was stirred with cooling until a temperature of 100° F. was reached. The resulting emulsion was viscous but stable.

EXAMPLE III

The same procedure as given in Example II was used to prepare an emulsion containing 7.5% octadecylamine, 1% "Ethoduomeen T/40", 0.25% glacial acetic acid, and 91.25% distilled water. The result was a stable liquid emulsion. After 1 cycle of freezing and thawing, it remained a viscous liquid and was still stable after 63 days.

EXAMPLE IV

Using the same procedure as in Example II, there was prepared a liquid emulsion containing 15% octadecylamine, 2% "Ethoduomeen T/40," 1.1% glacial acetic acid, and 81.9% tap water. The emulsion was stable, but it exhibited slight water separation after 6 days at 105° F.

EXAMPLE V

A series of octadecylamine emulsions was made to demonstrate the viscosity, consistency and cold water dispersibility effects produced by combining octadecylamine with varying proportions of acetic acid alone, non-anionic emulsifying agents alone, and combinations of acetic acid and non-anionic emulsifying agents.

The viscosity of each of these emulsions was measured with a Brookfield Viscometer, Model RVF, Spindle No. 4 at 10 revolutions per minute.

The weight percent of the ingredients in each of these emulsions and the viscosity, consistency and cold water dispersibility of each of these emulsions, as observed, are shown in Table I.

TABLE I

| Emulsion No. V | 1 | 2 | 3 | 4 | 5 | 6 | 7 | 8 | 9 | 10 | 11 |
|---|---|---|---|---|---|---|---|---|---|---|---|
| Octadecylamine, percent | 15.0 | 15.0 | 15.0 | 15.0 | 15.0 | 15.0 | 15.0 | 15.0 | 15.0 | 15.0 | 15.0 |
| Glacial acetic acid, percent | 0.5 | 0.9 | 1.3 | 2.0 | 4.0 | | | | 0.9 | 0.85 | 0.9 |
| "Ethomeen" 18/60, percent | | | | | | 1.5 | | | 1.5 | | |
| "Ethoduomeen" T/40, percent | | | | | | | 2.0 | | | 2.0 | |
| "Ethoquad" T/25, percent | | | | | | | | 1.5 | | | 1.5 |
| Water, percent | 84.5 | 84.1 | 83.7 | 83.0 | 81.0 | 83.5 | 83.0 | 83.5 | 82.6 | 82.15 | 82.6 |
| Viscosity in centipoises at 77° F | 72,600 | 13,400 | 25,000 | 102,600 | 66,000 | 117,200 | 49,300 | 66,800 | 4,060 | 5,160 | 3,820 |
| Consistency of emulsion | Paste | Paste | Paste | Paste | Paste | Paste | Paste | Paste | Liquid | Liquid | Liquid |
| Cold water dispersibility | No | No | No | No | No | No | No | No | Yes | Yes | Yes |

It will be noted that emulsions numbered V-1 through V-5, each containing only amine, acetic acid (in varying concentrations) and water were relatively very viscous pastes which were not cold water dispersible. Similarly the emulsions identified as emulsions numbered V-6 through V-8 and containing emulsifying agent but no acetic acid had a relatively very high viscosity and a paste consistency, and were not dispersible in cold water.

Emulsions V-9, V-10 and V-11 dramatically show the great unexpected advantages of the present invention. These last three emulsions, made by combining the individual non-anionic emulsifier of emulsions V-6 through V-8 respectively, with appropriate amounts of acetic acid, are each characterized by drastically reduced viscosity and ready cold water dispersibility. Each had a liquid consistency and was pourable.

EXAMPLE VI

The following fatty amine emulsions were prepared, following the procedure of Example I:

Emulsion No.:
VI-1.—Water 83.8%, Glacial acetic acid 0.8%, Octadecylamine 14.0%, Pluronic P-94 1.4%.
VI-2.—Water 82.6%, Glacial acetic acid 0.9%, Hexadecylamine 15.0%, Pluronic P-104 1.5%.
VI-3.—Water 88.5%, Glacial acetic acid 0.5%, Octadecylamine 10.0%, Ethomeen T/25 1.0%.
VI-4.—Water 85.8%, Glacial acetic acid 0.7%, Octadecylamine 12.0%, Ethomeen C/25 1.5%.
VI-5.—Water 81.4%, Glacial acetic acid 1.0%, Hexadecylamine 16.0%, Ethoduomeen T/20 1.6%
VI-6.—Water 82.6%, Glacial acetic acid 0.9%, Octadecylamine 15.0%, Ethoduomeen T/13 1.5%.
VI-7.—Water 79.2%, Glacial acetic acid 1.1%, Dodecylamine 18.0%, Ethoquad 0/25 1.7%.
VI-8.—Water 92.0%, Glacial acetic acid 0.3%, Octadecylamine 7.0%, Ethoquad C/25 0.7%.
VI-9.—Water 83.9%, Glacial acetic acid 0.8%, Octadecylamine 14.0%, Ethoduoquad T/25 1.3%.
VI-10.—Water 90.8%, Glacial acetic acid 0.5%, Hexadecylamine 8.0%, Ethoduoquad T/25 0.7%.

Each of these emulsions VI-1 through VI-10 was a relatively low viscosity liquid at room temperature and was dispersible in cold water.

It should be evident that various modifications can be made to the described embodiments without departing from the scope of the present invention.

What is claimed is:

1. An aqueous cold water dispersible amine emulsion consisting essentially of (a) at least about five percent by weight, based on total weight, of water-insoluble aliphatic amine having from 8 to 22 carbon atoms, (b) acetic acid, (c) water, and (d) a non-anionic emulsifying agent selected from the group consisting of block polymers of ethylene oxide and propylene oxide on a backbone of propylene glycol, polyoxyethylene fatty amines, polyoxyethylene N-fatty trimethylene diamines, alkyl chloride quaternary salts of polyoxyethylene fatty amines, and alkyl chloride quaternary salts of polyoxyethylene N-fatty trimethylene diamines, the molar ratio of acetic acid to aliphatic amine being in the range from about 0.1 to about 0.6, and the weight ratio of emulsifying agent to aliphatic amine being in the range from about 0.01 to about 1.

2. The emulsion of claim 1 in which said amine is octadecylamine.

3. An aqueous cold water dispersible amine emulsion as defined in claim 1 wherein said emulsifying agent is a block polymer of ethylene oxide and propylene oxide on a backbone of propylene glycol.

4. An aqueous cold water dispersible amine emulsion as defined in claim 1 wherein said emulsifying agent is a polyoxyethylene fatty amine.

5. An aqueous cold water dispersible amine emulsion as defined in claim 1 wherein said emulsifying agent is a polyoxyethylene N-fatty trimethylene diamine.

6. An aqueous cold water dispersible amine emulsion as defined in claim 1 wherein said emulsifying agent is an alkyl halide quaternary salt of a polyoxyethylene fatty amine.

7. An aqueous cold water dispersible amine emulsion as defined in claim 1 wherein said emulsifying agent is an alkyl halide quaternary salt of a polyoxyethylene N-fatty trimethylene diamine.

8. The emulsion of claim 7 in which said amine is octadecylamine.

9. The method of feeding a normally water-insoluble aliphatic amine having from 8 to 22 carbon atoms into an aqueous system which comprises feeding said amine into said system in combination with water, acetic acid and a non-anionic emulsifying agent, the said combination being derived from an aqueous emulsion as defined in claim 1.

10. The method of claim 9 in which said amine is octadecylamine.

References Cited

UNITED STATES PATENTS

| 2,882,171 | 3/1959 | Denman | 106—14 |
| 2,956,889 | 10/1960 | Denman | 106—14 |
| 3,034,985 | 5/1962 | Schoeld | 252—61 |

JOHN D. WELSH, Primary Examiner

W. E. SCHULZ, Assistant Examiner

U.S. Cl. X.R.

106—14; 117—5.5; 252—392